United States Patent

Miki et al.

[11] Patent Number: 5,578,208
[45] Date of Patent: Nov. 26, 1996

[54] FILTER FOR FILTERING MOLTEN RESIN AND A FILTERING DEVICE FOR MULTI-LAYER RESIN FORMING

[75] Inventors: Toshio Miki; Hideo Kometani; Hiroshi Fujimura; Yukio Goto; Hiroyuki Takagawa; Akira Nishikawa, all of Nagoya, Japan

[73] Assignee: Mitsubishi Jukogyo Kabushiki Kaisha, Tokyo, Japan

[21] Appl. No.: 218,950

[22] Filed: Mar. 29, 1994

[30] Foreign Application Priority Data

| Apr. 2, 1993 | [JP] | Japan | 5-098434 |
| Dec. 8, 1993 | [JP] | Japan | 5-307926 |
| Dec. 9, 1993 | [JP] | Japan | 5-309340 |

[51] Int. Cl.$^6$ ................................................ B01D 29/21
[52] U.S. Cl. ................ 210/487; 210/493.2; 210/493.5; 210/494.1; 210/497.3; 425/199
[58] Field of Search ....................... 425/197, 198, 425/199; 210/455, 486, 487, 493.1, 493.2, 493.5, 494.1, 494.2, 497.01, 497.2, 497.3, 356, 354

[56] References Cited

U.S. PATENT DOCUMENTS

| 2,460,084 | 1/1949 | Hebo | 210/356 |
| 3,224,590 | 12/1965 | Nord et al. | 210/438 |
| 3,233,739 | 2/1966 | Zievers et al. | 210/497 |
| 3,240,347 | 3/1966 | Zievers et al. | 210/459 |
| 3,291,310 | 12/1966 | Marvel | 210/356 |
| 3,326,382 | 6/1967 | Bozek et al. | 210/356 |
| 3,670,898 | 6/1972 | Fournier | 210/356 |
| 3,746,642 | 7/1973 | Bergstrom | 210/446 |
| 4,019,987 | 4/1977 | Krasnow | 425/198 |
| 4,332,541 | 6/1982 | Anders | 425/199 |
| 4,453,905 | 6/1984 | Bennett | 425/197 |
| 4,597,870 | 7/1986 | Lambertus | 425/199 |

FOREIGN PATENT DOCUMENTS

| 2121533 | 11/1972 | Germany . |
| 62-24502 | 6/1987 | Japan . |
| 2-253812 | 10/1990 | Japan . |
| 630548 | 10/1949 | United Kingdom . |

*Primary Examiner*—W. L. Walker
*Attorney, Agent, or Firm*—Jacobson, Price, Holman & Stern, PLLC

[57] ABSTRACT

A filter for flitrating molten resin of the invention includes: a cylindrical filtering member formed with a large number of projections and recesses; and radially arranged rods in a supporter for supporting the cylindrical filtering member at arc-shaped projected portions, and is constructed such that molten resin material is allowed to pass through the filtering member at arc-shaped recessed portions. In this arrangement, it is possible to enhance the resistance of thermoplastic molten resin filter against filtering pressure as well as to ensure a large filtering area. Further, the filter may be constructed such that the cross-section of the aforementioned cylindrical member is made greater from the upstream side toward the downstream side. By this configuration, the flow rate of molten resin passing through the unit area of the filtering member is made uniform and consequently the collecting capacity of foreign substances is increased.

10 Claims, 14 Drawing Sheets

FILTER FOR FILTERING MOLTEN RESIN AND A FILTERING DEVICE FOR MULTI-LAYER RESIN FORMING

FIELD OF THE INVENTION AND RELATED ART STATEMENT

The present invention relates to a filter for filtering molten resin for use in a manufacturing process of films or fabric made of polypropylene, polyester and the like.

It is extremely critical in quality control to remove foreign substances or impurities from molten resin in preparing a film or fabric from the molten resin. Therefore, various kinds of filters have been developed up to now. FIGS. 15 through 21 show examples of cylindrical filters used conventionally.

The cylindrical filter shown in FIGS. 15 to 17 is made up of a cylindrical filtering member 1a and a porous plate 14 and the cylindrical filtering member 1a takes a form of an annular or pleat-like cross-section. A large number of such cylindrical filters constitute a filtering device.

The molten resin enters the inside of the cylinder by way of filtering member 1a and porous plate 14 and is extracted from an opening 3a. During the filtering process, filtering member 1a is supported from the inside thereof by porous plate 14 since the filtering member 1a itself is not enough rigid to stand the filtering pressure.

FIGS. 18 and 19 show a filter including a filtering member 16 in which projected portions 5b and recessed portions 6b are provided alternately by press-forming a flat-plate screen 1b as disclosed in Japanese Patent Application Provisional Publication (Kokai) No.2-253812. The molten resin flows into a filtering member 16 from an entrance 15 and passes through filtering member 16, and flows out from an exit 17 of filtering member 16.

FIGS. 20 and 21 shows a filter disclosed in Japanese Utility Model Publication (Kokoku) No.62-24502 in which a filtering surface 18 is arranged so as to be perpendicular to the flow direction of molten resin while the filter surface 18 has short and long projections 19 and 20 extending in the flow direction of molten resin, and a filter is arranged alternately mesh-wise forming an uneven filtering surface by the difference of projecting lengths. A molten resin flows from the filter surface 18 having alternate projections and is filtered.

The present invention further relates to a filtering device for filtering molten resins which is employed in a multi-layer resin-forming extruder for forming films by laminating resins such as polypropylene, polyester, etc., in accordance with required film properties or characteristics. The molten resin filter of this invention can be used in this device.

It is impossible in general to completely avoid contamination of foreign substances when resin materials are transported and stored or used in extruding process and the like. Mold products made of contaminated material have degraded quality. Therefore, a filtering stage is usually provided in a production line so as to remove contaminants. For such production lines, there have been various inventions as to methods of cleaning or replacing screens which have been filled up with foreign substances during the filtering stage.

Referring now to FIGS. 22 through 27, a generally used screen changer will be described together with an extruder equipped with a conventional combining die adapter.

As shown in FIGS. 22 and 23, designated at 101 is a conventional combining T-die. Resins are supplied through conduits 102, 103 and 104 which extend toward combining T-die 101. These resins are spread out in width direction, followed by laminating so as to be pushed out from an exit 106 by way of a slit 105.

Designated at 107, 108 and 109 are conduits for introducing molten resins extruded from respective extruders 110, 111 and 112 to combining T-die 101. Conduits 107, 108 and 109 are connected at one end to front portions of the re-spective extruders while the other end of each conduit 107, 108 or 109 is connected with the aforementioned conduit 102, 103 or 104 respectively, which are jointed to combining T-die with bolts, etc.

Extruders 110, 111 and 112 are of a conventional type and are directed to knead and extrude resins as sheet or film materials. Molten resins extruded from the three extruders 110, 111 and 112 are introduced into combining T-die 101 through conduits 107 and 102, conduits 108 and 103 and conduits 109 and 104, respectively.

In this arrangement, a replaceable filter for removing foreign substances contained in molten resin is disposed between conduit 107, 108 or 109 and mating extruder 110, 111 or 112. The filter, as shown in FIGS. 24 and 25, is constructed by disposing a breaker plate 115 and a screen 116 between a cylinder 113 and an adapter 114 and fixing them with nuts 117.

The breaker plate 115 may back up or supports screen 116 for filtration so as to prevent screen 116 from being deformed by flitrating resistance or pressure and has a large number of pores so as to ensure flow paths of resin. Here, screen 116 is disposed on the inflow side.

The molten resin pushed out from cylinder 113 by means of a screw 118 is filtrated by screen 116 while foreign substances contaminated in the resin is trapped by screen 116, remaining on the surface thereon. Thus, the resin flowing into the side of adapter 114 will be totally cleaned.

As the residual impurities fill up the screen, the resistance increases, resulting in reduction of resin flow rate. In such cases, the operation of the extruder will be halted and the screen filter 116 will be replaced with new one.

This exchanging operation can be effected by loosing nuts 117, releasing I-bolts 120 side to side, each of which is hinged pivotably at a pin 119 on the side of cylinder 113 and moving adapter 114 backward so as to allow breaker plate 15 with screen 116 mounted to be taken out.

Then, a previously prepared assembly of screen 116 and breaker plate 115 is fit in a reversing order opposite to that in the aforementioned operation. After clamping so as to prevent leakage of resin, the operation will be restarted.

The exchanging method of screens shown in FIGS. 24 and 25 has advantages that the structure is simple and leakage of resin can be easily prevented. The flitrating area obtained in this configuration, however, is only as small as the extruder size. As a result, the screen must be frequently replaced, requiring the operation to be stopped. This loss of operation will lower the operation rate.

To deal with this, a screen changer as shown in FIGS. 26 and 27 may be used. Specifically, the screen changer comprises: a changer body 121 forming a resin flow passage; a slide plate 122 being slidably fit in the changer body 121; and a adjust ring 123 and a thrust ring 124 disposed in the changer body 121 and coming in pressing contact with the slide plate 122 for the purpose of preventing resin leakage. There are a couple of screens 125 and breaker plates 126 on slide plate 122, and one of them will be used in operation and the other is for the replacement.

Exchange of the screen 125 and the breaker plate 126 is performed by sliding slide plate 122 in the horizontal direction by means of a hydraulic cylinder 127. When the screen 125 in use in the changer body 121 is filled up with impurities in a certain degree, slide plate 122 is shifted to the right by means of hydraulic cylinder 127 so that the used screen exposed outside the body may be replaced with new one.

Similarly, the screens will be changed over side to side at suitable intervals to continue the operation. Here, slide plate 122 is switched by a manual valve while a motor, hydraulic pump, etc. is provided for hydraulic cylinder 127.

OBJECT AND SUMMARY OF THE INVENTION

The filters shown in FIGS. 15 to 21 use a porous plate 14 in order to provide rigidity for standing against the filtering pressure. Accordingly, the effective flitrating area would be limited to be small, suffering from a high pressure difference between before and behind the filter. The filter shown in FIGS. 18, 19A and 19B, which is disclosed in Japanese Patent Application Provisional Publication (Kokai) No.2-253812, merely uses a filtering member 16 in which projected portions 5b and recessed portions 6b are provided alternately by press-forming a flat-plate screen 1b. Accordingly, the rigidity against filtering pressure is small. Further, a large filtrating area is required since the flow rate of molten resin per unit area must be inhibited to be small in the thermoplastic melt-forming of thermoplastic resins.

Meanwhile, in the case of the filter shown in FIGS. 20 and 21 in Japanese Utility Model Publication (Kokoku) No.62-24502, the molten resin selectively flows through the route having the smallest loss of the flowing pressure. Therefore, in the beginning, the flow rate is large in the regions of short projections 19 until foreign substances are trapped in the portions, and thereafter the resin starts to flow in the regions of long projections 20. For this reason, the effective filtrating area is small. It is true that the screen is reinforced with reinforcing wires 21, but disadvantageously the screen will not provide enough rigidity to stand the filtering pressure since the wires are provided in only one direction.

Accordingly, with regard to the filters of this kind, it has been necessary for the filter to stand high filtering pressure caused by the thermoplastic molten resin and ensure a large filtrating area.

The present invention has been proposed in order to solve the conventional problems described heretofore.

To achieve this in the present invention, a filter for filtrating molten resin comprises: a cylindrical filtering member formed with a large number of projections and recesses; and a radially arranged supporter for supporting the cylindrical filtering member at arc-shaped projected portions, and is constructed such that molten resin material is allowed to pass through the filtering member at arc-shaped recessed portions. The aforementioned filtering member is constructed by either one of a laminated metallic screen, a calcinated laminated metallic screen, a sintered metal felt fabric, or a sintered metal powder. Further, the supporter is formed with projections and recesses, each of the projections being in contact with a corresponding projected portion of the filtering member while the recesses are formed deeper toward a cylindrical center than the recessed portions of the filtering member. The molten resin having passed through the recessed portions of the filtering member flows through spaces formed between the recessed portions of the filtering member and the recesses of the supporter in the length-wise direction of the cylinder. The thus constructed means will serve to solve the aforementioned problems.

Moreover, the aforementioned supporter includes: a plurality of rod members each having a circular section and being in contact with a corresponding projected portion of the filtering member; a cylindrically centered member; and a plurality of connecting members disposed at intervals in the length-wise direction of the cylinder for jointing the rod members with the cylindrically centered member and further comprises an upper lid member and a lower lid member equipped with an orifice for discharging molten resin, each of the lid members being provided with a groove having the same shape with the cross-section of the filtering member so as to allow the filtering member to be inserted therein. This arrangement also works as means to solve the aforementioned problems.

Recessed portions 6 of the filtering member serving as paths of molten resin are formed in arc. Therefore, a relation $T=R \cdot \Delta P$ will hold where R represents a radius of curvature of the arc, $\Delta P$ represents a pressure difference of the molten resin before and behind the filter and T represents a tension force acted on the filtering member over a unit length. If an allowable tension force of the filtering member is assumed as Ts, the radius of curvature R of the arc portion in recess 6 of the filtering member may be selected from a range where $R<Ts/\Delta P$. Consequently, it is no more necessary to use a porous plate which would be used in the conventional cylindrical filters in order to enhance the rigidity resisting to flitrating pressure. Besides, it is also possible to ensure a large effective flitrating area.

In accordance with the present invention, since the filter formed in advance with a large number of arced recesses and projections is supported by a radial supporting member, it is possible to reduce the tension force which arises in the filtering member against flitrating pressure. Accordingly, it is possible to bear the elevated flitrating pressure which increases due to the collection of foreign substances. Further, since it is also possible to omit the porous plate which has been provided in the conventional cylindrical filters in order to stand the flitrating pressure, the effective filtrating area can be taken large to thereby allow use of the filter in a prolonged period.

Since cylindrical filtering member 1a of the filter shown in FIGS. 15 and 16 is uniform in its cross-section, the flow rate of molten resin passing through filtering member 1a becomes larger toward the downstream side, presenting problems of an uneven flow rate distribution and therefore causing a great pressure difference.

Similarly, in the filter seen in FIGS. 18 and 19 disclosed in Japanese Patent Application Provisional Publication (Kokai) No.2-253812, the cross-section for the path of molten resin after the passage of filtering member 1a becomes smaller toward the downstream side, presenting problems of an uneven flow rate distribution of the molten resin passing through filtering member 1a and therefore causing a great pressure difference.

Further, in the filter shown in FIG. 15, upper lid member 12 disposed at the top of the filter, filtering member 1a and lower lid member 13 having a molten resin outlet orifice are joined one another by welding between their boundaries. Hence, when filtering member 1a is to be replaced, the whole structure including upper and lower lid members 12 and 13 must be thrown away.

It is therefore another object of the present invention is to provide a molten resin filter which is able to solve the aforementioned conventional problems by forming the filter body in a shape of a cylinder or frustum where the cross-section of the cylinder-like body becomes larger from the upstream side toward the downstream side.

To achieve this in the present invention, a filter for filtrating molten resin comprises: a cylindrical filtering member formed with a large number of projections and recesses; and a radially arranged supporter for supporting the cylindrical filter at arc-shaped projected portions, wherein resin material is allowed to pass through the filtering member at arc-shaped recessed portions; the supporter is formed with projections and recesses, each of the projections being in contact with a corresponding projected portion of the filtering member while the recesses are formed deeper toward a cylindrical center than the recessed portions of the filtering member; and the molten resin having passed through the recessed portions of the filtering member flows through spaces formed between the recessed portions of the filtering member and the recesses of the supporter in the length-wise direction of the cylinder, and is constructed such that the cross-section of the cylindrically shaped portion is made greater from the upstream side toward the downstream side. The aforementioned filtering member is constructed by either one of a laminated metallic screen, a calcinated laminated metallic screen, a sintered metal felt fabric, or a sintered metal powder. The aforementioned supporter includes: a plurality of rod members each having a circular section and being in contact with a corresponding projected portion of the filtering member; a cylindrically centered member; and a plurality of connecting members disposed at intervals in the length-wise direction of the cylinder for jointing the rod members with the cylindrically centered member. Further, there are provided an upper lid member and a lower lid member equipped with an orifice for discharging molten resin, each of the lid members being provided with a groove having the same shape with the cross-section of the filtering member so as to allow the filtering member to be inserted therein. The thus constructed means will serve to solve the aforementioned problems.

In the present invention, threaded members for jointing the filtering member with the cylindrically centered member of the supporter by means of mating threads are provided in order to fix the filtering member inserted between the upper lid member and the lower lid member having an orifice for discharging molten resin. This configuration is also to serve as a means to solve the aforementioned problems.

In the present invention, since all the molten resin after passing through the filtering member comes together to flow through the molten resin passage that becomes larger in its cross-section toward the downstream side, the molten resin flow rate for each unit area may be uniform in any parts of the filtering member and the pressure loss may be small while the filtration capacity becomes large.

Further, since the filtering member is held by and inserted into the upper and lower lid members while being assembled with the help of a cylindrical shaft having threaded portions at both ends of the supporter for supporting the filtering member, the exchange of a filtering member can be carried out by simply pulling out the filtering member after removal of the upper lid member so that it is possible to shorten the time for replacement.

As detailed heretofore, according to the present invention, since the filtering member is formed in advance with a large number of arced recessed and projected portions with the cross section of the filtering member being increased from the top to the bottom and the thus formed filtering member is supported by the radial supporter, it is possible to uniform the flow amount of molten resin that passes through the filtering member for the unit area on the filtering member. As a result, the flitrating pressure can be lowered and the collecting capacity of foreign substances is improved. In addition, the filtering member is attached by means of threaded members which are connected by mating threaded members and the cross-section of the filtering member varies as described above, so that the replacement of the filtering member can be easily done.

With regard to the case of the screen changer shown in FIGS. 26 and 27, the time and labor for the replacement of screens can be sharply saved, but the effective filtrating area itself is unchanged. Therefore, the filter must be replaced as often as used to be, requiring frequent operation stops. Therefore the loss due to operation stops will never be eliminated. Further, in this screen changer, slide plate 122 is to be slidable while the resin must be sealed. These features however contradict each other. Consequently, the changer cannot help taking a structure in which resin leakage is liable to occur.

The present invention is to solve such problems in the conventional filtering devices. In order to achieve this, the present invention is to provide filtering devices for flitrating resins for multi-layer resin forming wherein a reliable filtration process can be established by using common filter elements for all the filtering devices for different resin layers while the filter element can provide an increased effective filtering area without increasing the outside dimension of the extruder for flitrating resin for multi-layer resin forming; the quality of a film manufactured is improved by making constant the qualities of resins for different layers; the interval of replacing the element in the filtering device can be prolonged; and the levels of reliability for all the elements can be equalized by allowing common tools and/or instruments to be used for changing all the elements for different filtering devices for different resin layers.

Accordingly, in the present invention, a filtering device for filtrating molten resin for use in forming multi-layer resin, is constructed such that a filter for filtrating molten resin is disposed on a passage of molten resin between a cylinder of an extruder for molten resin and a conduit leading to a combining T-die and the filter comprises: a cylindrical filtering member formed with a large number of projections and recesses; and a radially arranged supporter for supporting the cylindrical filtering member at arc-shaped projected portions, wherein the molten resin material is allowed to pass through the filtering member at arc-shaped recessed portions.

Further, a filtering device for flitrating molten resin for use in forming multi-layer resin comprises: a main cylinder for supplying a molten resin; auxiliary cylinders for supplying molten resins; a T-die which is connected with the main cylinder and auxiliary cylinders through respective conduits for receiving molten resins and spreads supplied molten resins in the width direction so as to extrude a laminated resin material, and is constructed such that each conduit which is connected to an auxiliary cylinder has a cylindrical filter element for flitrating molten resin disposed coaxially thereinside; and the conduit connected to the main cylinder has a plurality of the same cylindrical filter elements for filtrating molten resin disposed in a number in accordance with the amount of resin supply in parallel with one another on the resin passage from the main cylinder to the T-die, where the filter element for filtrating molten resin comprises: a cylindrical filtering member formed with a large number of projections and recesses; and a radially arranged supporter for supporting the cylindrical filtering member at arc-shaped projected portions, and molten resin material is allowed to pass through the filtering member at arc-shaped recessed portions. The thus constructed means will serve to solve the aforementioned problems.

As the present invention is thus constructed, the recessed portions of the filtering member serving as the passages of molten resin are formed in arc. Accordingly, a relation T=R·ΔP will hold where R represents a radius of curvature of the arc, ΔP represents a pressure difference of molten resin before and behind the filter and T represents a tension force acted on the filtering member over a unit length. If an allowable tension force of the filtering member is assumed as Ts, the radius of curvature R of the arc portion in the recessed portion of the filtering member may be selected from a range where R<Ts/ΔP. As a result, it is no more necessary to use a porous plate which would be used in the conventional cylindrical filters in order to enhance the rigidity resisting to flitrating pressure, and it is therefore possible to ensure a large effective fil trating area.

The thus constructed cylindrical filter which has an extremely large effective filtering area as compared to the outside dimension thereof can be mounted inside the conduit supplying molten resin from the auxiliary cylinder to the T-die, so that there is no need to take a particular space for mounting the filtering device.

Further, a number, in association with the amount of resin supply, of the filter elements each having such an extremely large flitrating area are bundled in parallel with one another to form a filtering device and the thus constructed filtering device is disposed downstream of the cylinder of the main cylinder while the identical filter element is used for the elements for the filtering devices forming different resin layers in a multi-layer resin structure. Accordingly, all the resins for different layers can be uniformed in quality and therefore the quality of the produced film can be improved and it is also possible to linger the life or exchange span of the elements in the filtering devices. Moreover, all the elements for the filtering devices forming different resin layers can be exchanged by common tools and the levels of reliability for all the filter devices can be equalized.

As has been detailed, according to the present invention, it is possible to increase the filtering area of a satellite extruder fifteen to thirty times as large as that of the conventional device. Therefore, it is possible to reduce the frequency of replacement of the filter to one fifteenth to one thirtieth of that used to be. Further, since the filtering device does not need any particular space for mounting at the same time the device may create such a large filtering area, it is possible to increase the space available by configuring the device to be built in the conduit or other different ways.

Besides, by using the same filters for all the extruders, it is possible to not only level the quality of resins for different film layers but also to economize the exchange of the filters since only one kind of exchange filter is enough to be prepared. Moreover, since identical filters are used for all the extruders, it is possible to share the additional devices or tools required for the replacement of filters, thus making it possible to economize the exchange of filters.

DETAILED DESCRIPTION OF THE PREFERRED EMBODIMENTS

The present invention will hereinafter be described with reference to the accompanying drawings.

Figure 1:
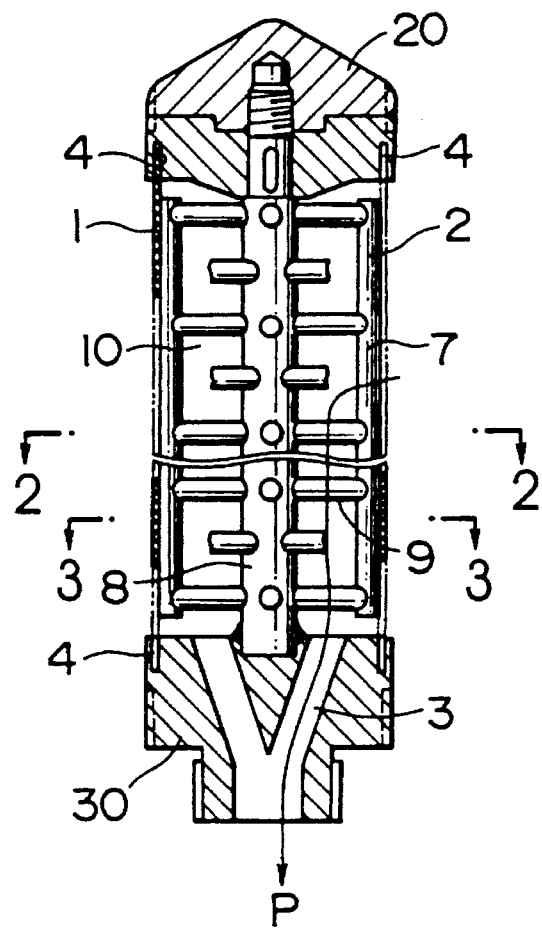
FIG. 1 is a vertical sectional view showing a molten resin filter in accordance with a first embodiment of the present invention.
Figure 2:
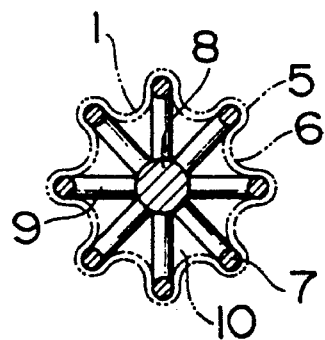
FIG. 2 is a sectional view taken on a line A—A in FIG. 1.
Figure 3:
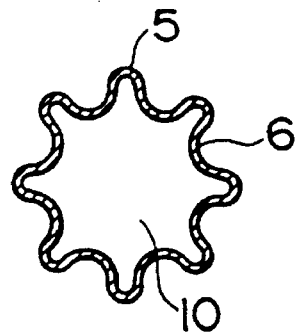
FIG. 3 is a sectional view taken on a line B—B in FIG. 1.

FIGS. 1 through 3 show a first embodiment of the present invention. In the figures, reference numeral 1 designates a filtering member made of a sintered screen. Reference numerals 2 and 3 designate a supporter and a lower orifice, respectively. Designated at 4 is an inserting groove to which filtering member 1 is fit in. FIGS. 2 and 3 are sections taken on lines A—A and B—B in FIG. 1, respectively. Filtering member 1 is formed with arced projected portions 5 and arced recessed portions 6. Each projected portion 5 is in contact with supporter 2 while each recessed portion 6 serves as a passage for molten resin. A preferable radius of curvature R for recessed portion 6 is selected in accordance with the relation R<Ts/ΔP.

Supporter 2 is constructed of a plurality of rods 7 each being in contact with a corresponding projected portion 5 of filtering member 1, a central cylindrical shaft 8 and a plurality of rods 9 arranged at intervals in the cylindrical length-wise direction and extending radially to join rods 7 with central cylindrical shaft 8.

Molten resin passes through filtering member 1 in recessed portions 6 from the outside toward the inside. The thus filtrated molten resin advances to the passages formed in a filter center 10 to be discharged from lower orifice 3.

Figure 4:
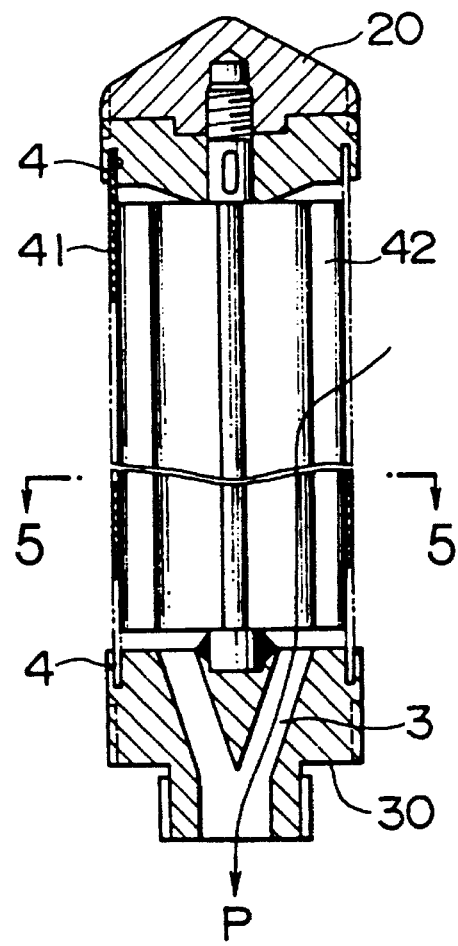
FIG. 4 is a vertical sectional view showing a molten resin filter in accordance with a second embodiment of the present invention.
Figure 5:
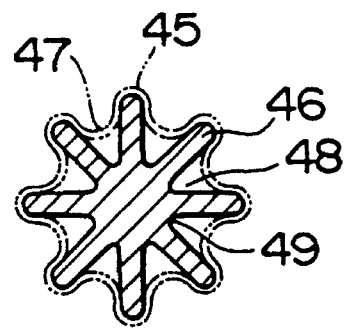
FIG. 5 is a sectional view taken on a line C—C in FIG. 4.

FIG. 4 shows a second embodiment of the present invention and FIG. 5 is a C—C section of FIG. 4. Here, the structure of supporter 2 differs from the first embodiment. The supporter 2 of this embodiment is constructed, as shown in FIG. 5, of a cylinder having projected and recessed portions forming projections 46. More specifically, supporter 2 comprises a plurality of projections 46 each being in contact with a corresponding projected portion 45 of a filtering member 41, a plurality of recesses 49 which, in cooperation with recessed portions 47 of filtering member 41, define spaces 48 for flow paths allowing molten resin to flow in the length-wise direction of the cylinder.

Molten resin passes through filtering member 41 in recessed portions 47 radially from the outside toward the inside. The thus flitrated molten resin flows into spaces 48 formed between recessed portions 47 of filtering member 41 and recesses 49 of supporter 42 to be discharged from lower orifice 3. Here, with regard to the radius of curvature R for recessed portions 6 of filtering member 1 and recessed portions 47 of filtering member 41, there holds a relation T=R·ΔP, where T represents a tension force for the filtering member over a unit length. Therefore, the radius of curvature of the arc portion in the recessed portion of the filtering member may be selected from a range where R<Ts/ΔP. Here, again, R represents the radius of curvature of the arc portion of the filtering member, Ts represents an allowable tension force (kgf/cm) for the filtering member and ΔP represents a differential pressure (kgf/cm²) in molten resin before and behind the filter. It is possible to increase the allowable tension force Ts for the filtering member by selecting a proper R based on the relation R<Ts/ΔP. As a result, it is possible to enhance the rigidity resisting to filtering pressure without using reinforcing elements as used to be in the conventional porous plate.

Either of the filters of first and second embodiments has supporter 2 which includes rod members 7 or projections 46 arranged radially and extending in the length-wise direction (axial direction). The filter further includes lid members 20 and 30 closing both ends (top and bottom ends in the figure) so as to form a cylindrical cage-like structure. Lower lid member 30 is formed with orifice 3 for discharging the molten resin having been flitrated. The flow of the resin is designated by p in the figures. Either of top and bottom lid members 20 and 30 is formed with a groove 4, 4 having an identical shape with the cross-section of filter ing member 1 or 41 so as to allow the filtering member to be fit into the grooves. The provision of these grooves establishes reliable mounting of the filtering member.

Figure 6:
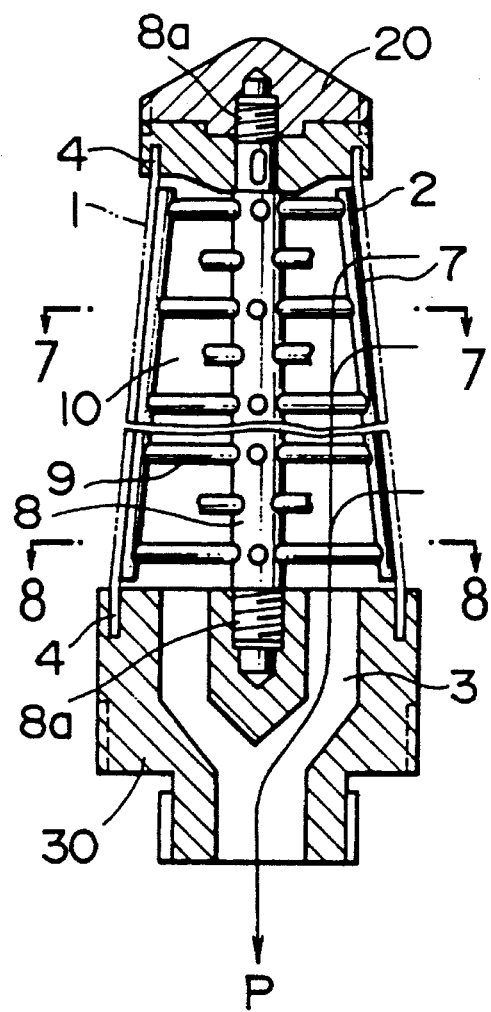
FIG. 6 is a vertical sectional view showing a molten resin filter in accordance with a third embodiment of the present invention.
Figure 7:
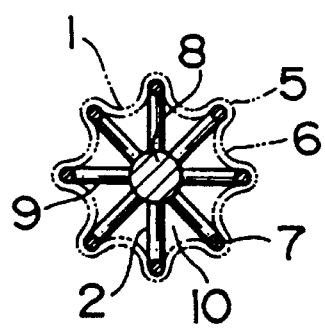
FIG. 7 is a sectional view taken on a line A—A in FIG. 6.
Figure 8:
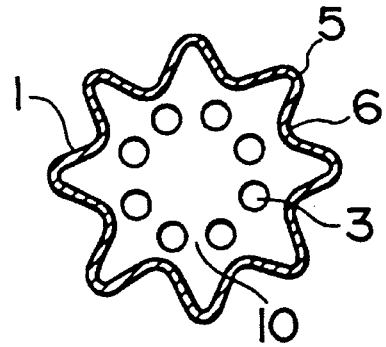
FIG. 8 is a sectional view taken on a line B—B in FIG. 6.

FIGS. 6 to 8 show a third embodiment of the present invention. FIG. 7 is an A—A section of FIG. 6 and FIG. 8 is a B—B section of FIG. 6.

The configuration of the third embodiment is similar to that in the first embodiment except in that the cylindrical structure in the first embodiment is replaced by a frustum structure of which the cross-section becomes larger from the upstream side toward the downstream side.

Figure 9:
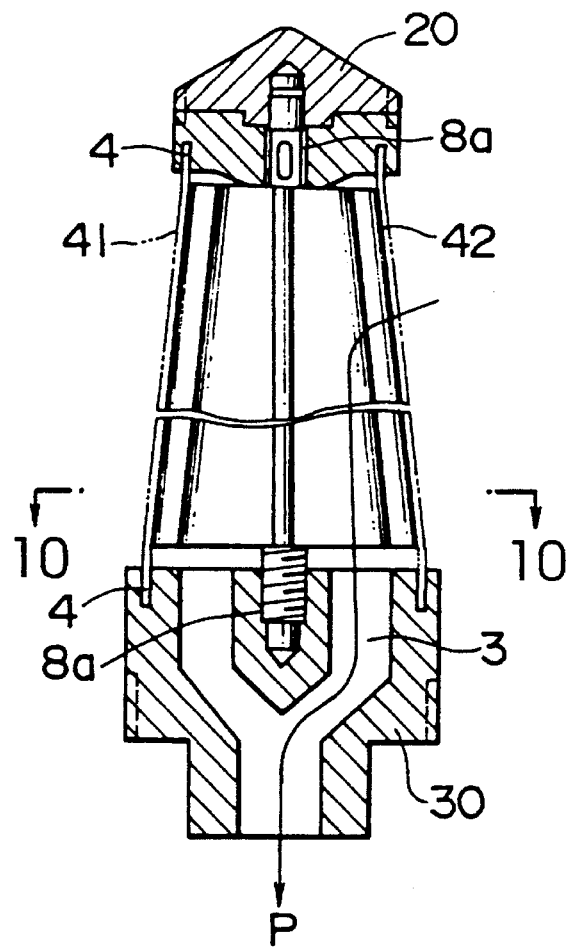
FIG. 9 is a vertical sectional view showing a molten resin filter in accordance with a fourth embodiment of the present invention.
Figure 10:
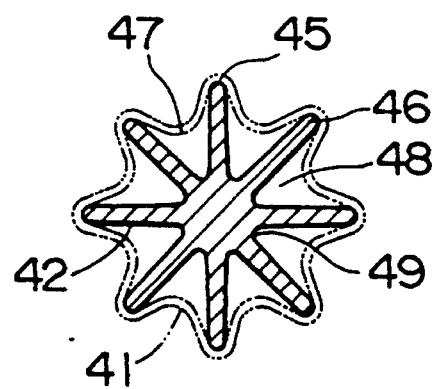
FIG. 10 is a sectional view taken on a line C—C in FIG. 9.

FIGS. 9 and 10 show a fourth embodiment of the present invention. FIG. 10 is a C—C section of FIG. 9.

The configuration of the fourth embodiment is similar to that in the second embodiment except in that the cylindrical structure in the second embodiment is replaced by a frustum structure of which the cross-section becomes larger from the upstream side toward the downstream side.

Figure 11:
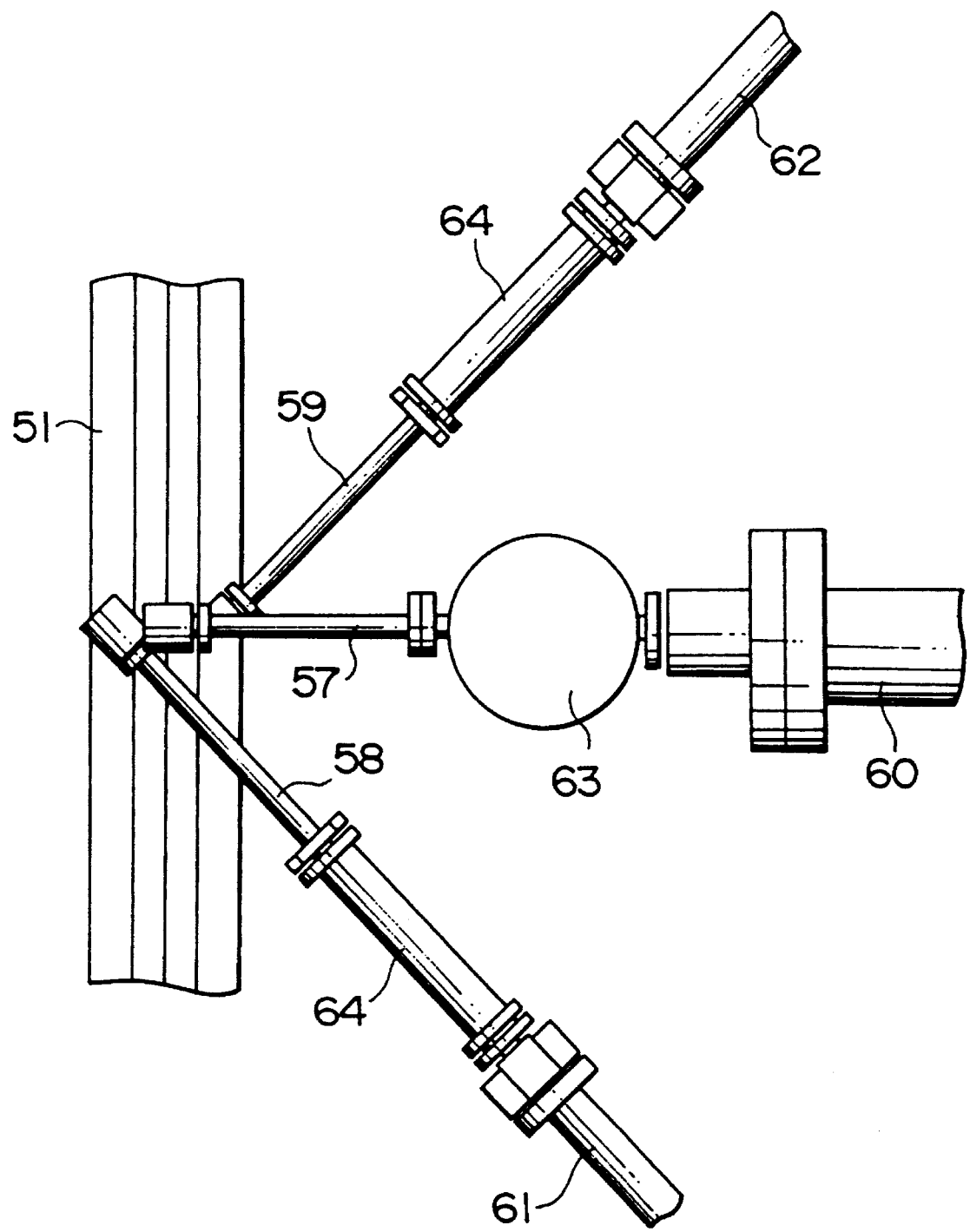
FIG. 11 is a plan view showing an embodiment of an extruder for multi-layer resin forming using a filtering device of the present invention.
Figure 12:
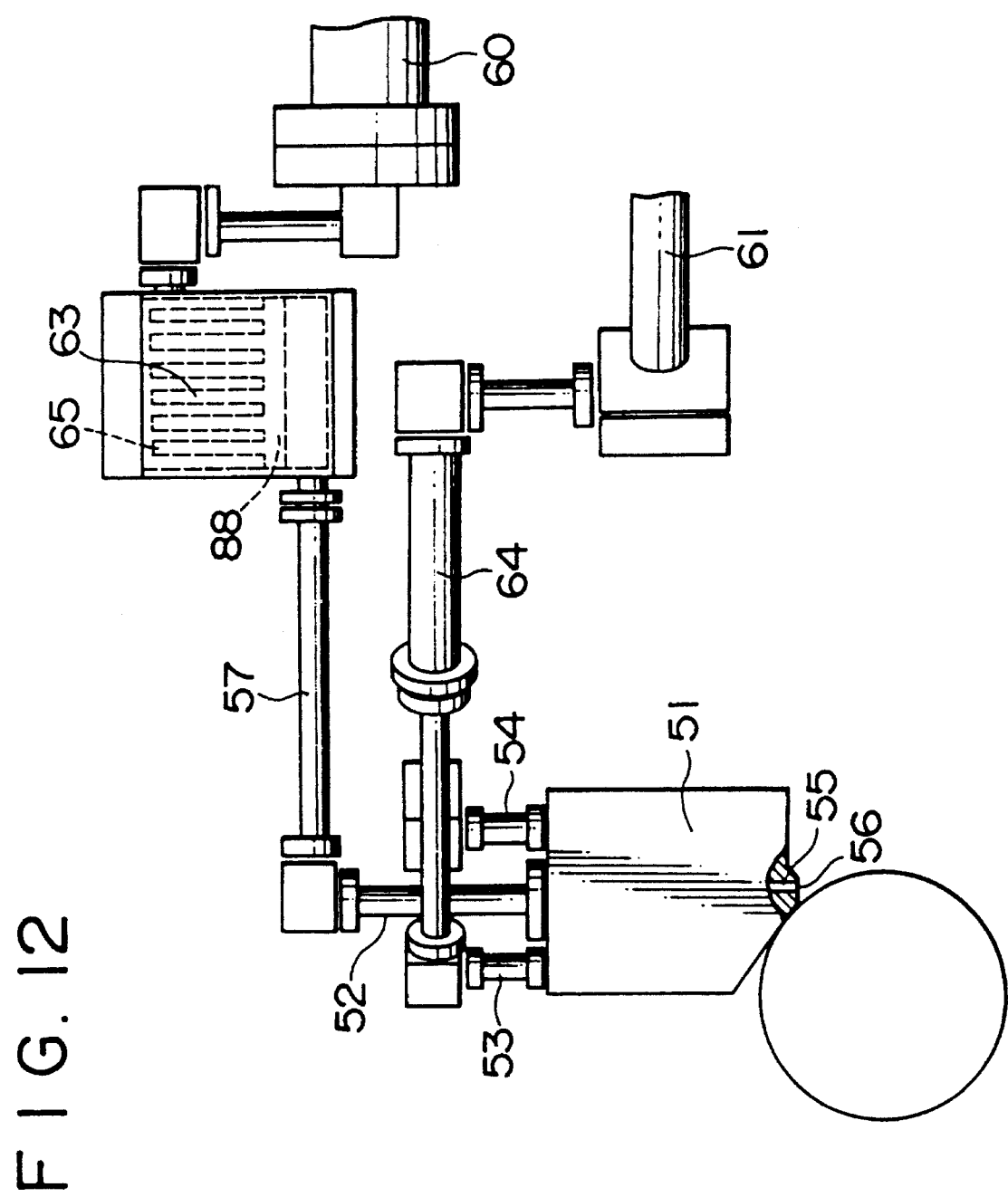
FIG. 12 is a side view of FIG. 11.

FIGS. 11 through 14 show a fifth embodiment of the present invention. As shown in FIGS. 11 and 12, a combining T-die 51 extends the resins supplied from conduit 52, 53 and 54 in their width direction and thereafter laminates these resins to be extruded from an exit 56 by way of a slit 55.

Reference numerals 57, 58 and 59 are conduits for introducing the molten resins from a main extruder 60 and auxiliary extruders 61 and 62 to the aforementioned combining T-die 51. Conduit 57 is connected on the upstream side with a filtering device 63 disposed in front of main extruder 60 whereas conduit 58 and 59 are connected on the upstream side with filtering devices 64 disposed in front of extruders 61 and 62, respectively. Each of the aforementioned conduits 57, 58 and 59 is connected on the downstream side with corresponding conduit 52, 53 or 54, all of which in turn are connected to combining T-die 51 with fixing bolts, etc.

Extruders 60, 61 and 62 are of a publicly known type and are directed to knead and extrude resins as sheet or film materials. Molten resins extruded from the three extruders 60, 61 and 62 are introduced into combining T-die 51 through conduits 57 and 52, conduits 58 and 53 and conduits 59 and 54, respectively.

Figure 13:
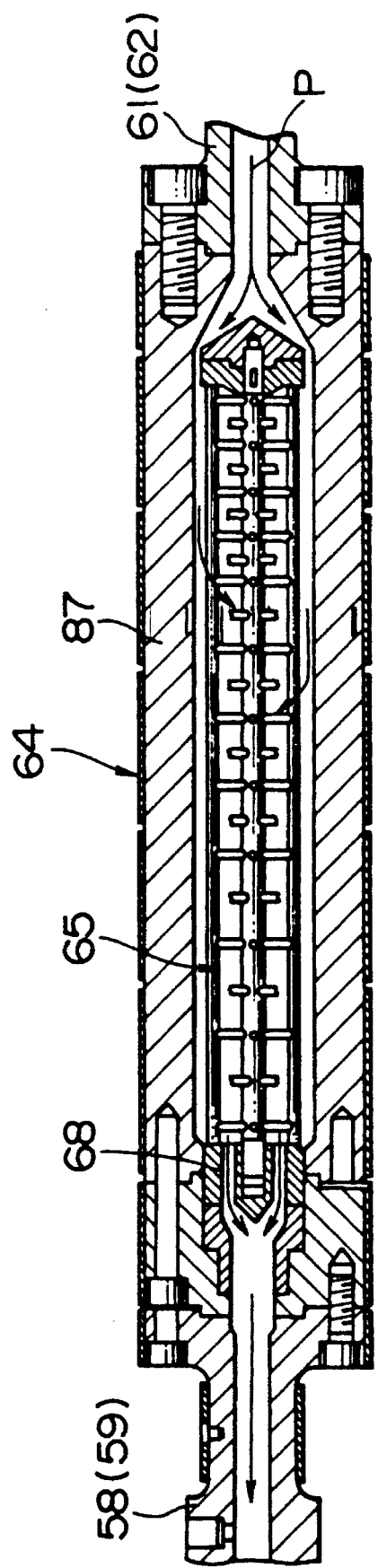
FIG. 13 is a vertical sectional view showing a filtering device shown in FIG. 11.
Figure 14:
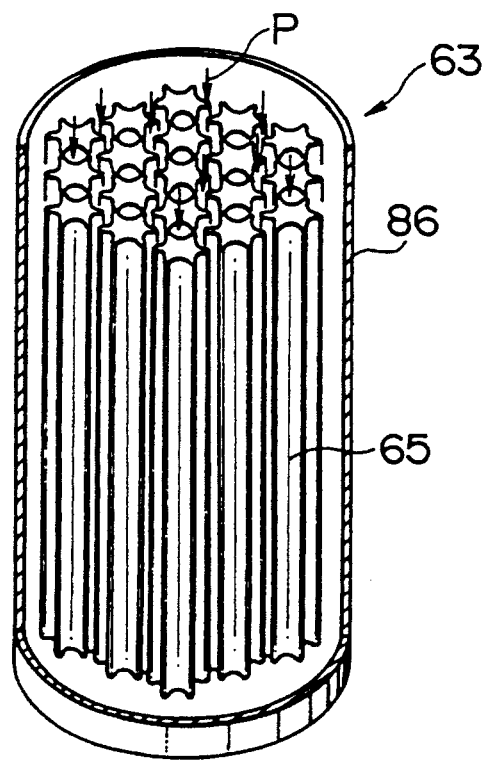
FIG. 14 is a perspective, partially cutaway view showing another filtering device shown in FIG. 11.
Figure 15:
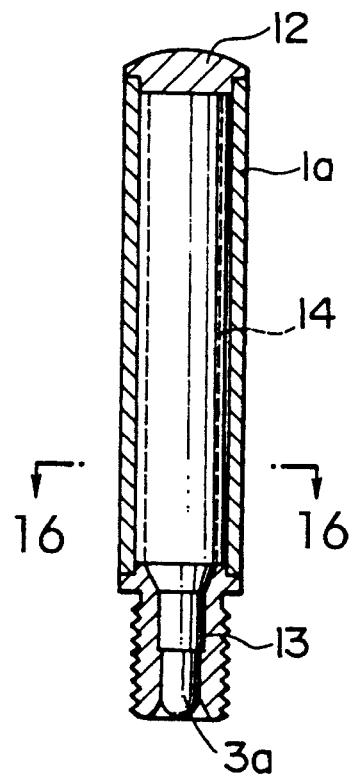
FIG. 15 is a vertical sectional view showing a prior art cylindrical filter.
Figure 16:
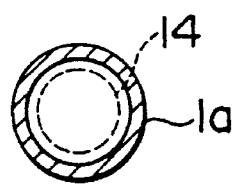
FIG. 16 is a sectional view of an annular filtering member in FIG. 15.
Figure 17:
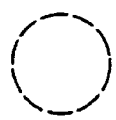
FIG. 17 is a sectional view showing a pleat-like filtering member in FIG. 15.
Figure 18:
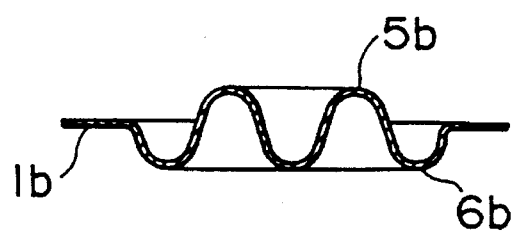
FIG. 18 is a sectional view showing a conventional filter material.
Figure 19A:
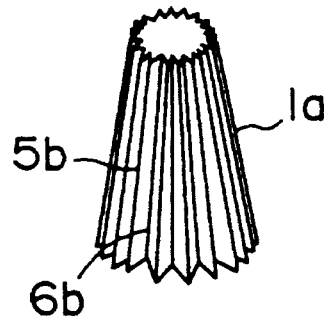
FIG. 19A is a perspective view showing a filtering member employing the filter material shown in FIG. 18.
Figure 19B:
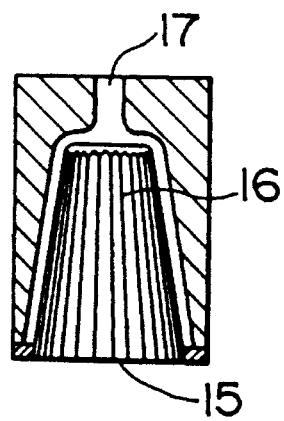
FIG. 19B is a sectional view of a filtering device using the filter material shown in FIG. 18.
Figure 20:
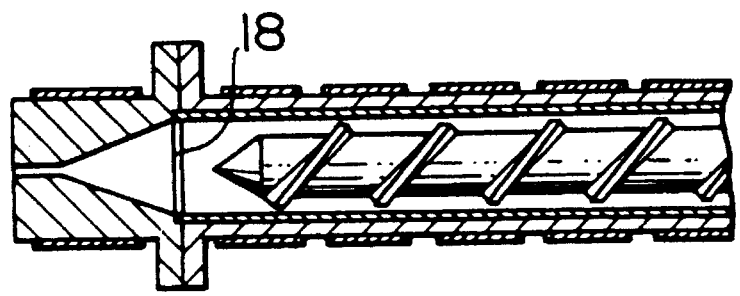
FIG. 20 is a sectional view showing a conventional filter portion.
Figure 21:
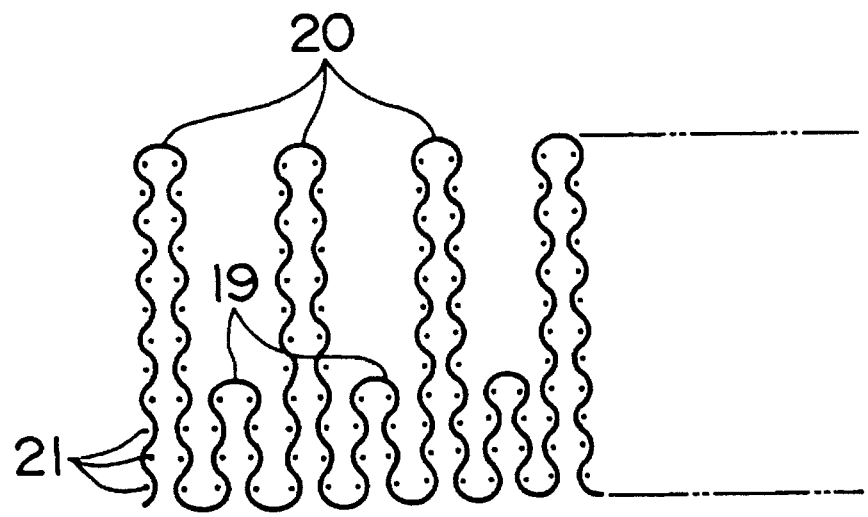
FIG. 21 is an enlarged view showing a filter material used in FIG. 20.
Figure 22:
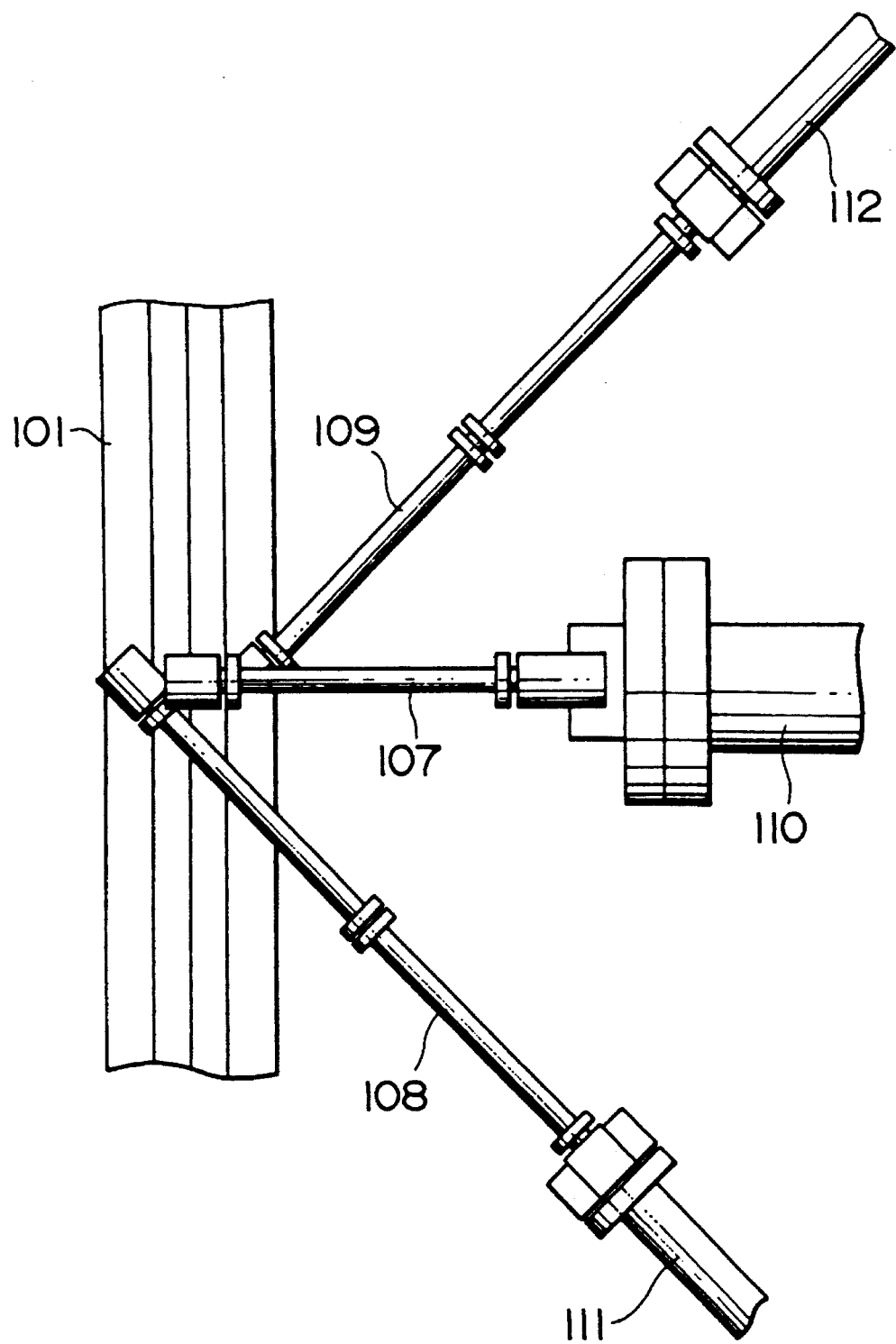
FIG. 22 is a plan view showing a conventional extruder for multi-layer resin forming.
Figure 23:
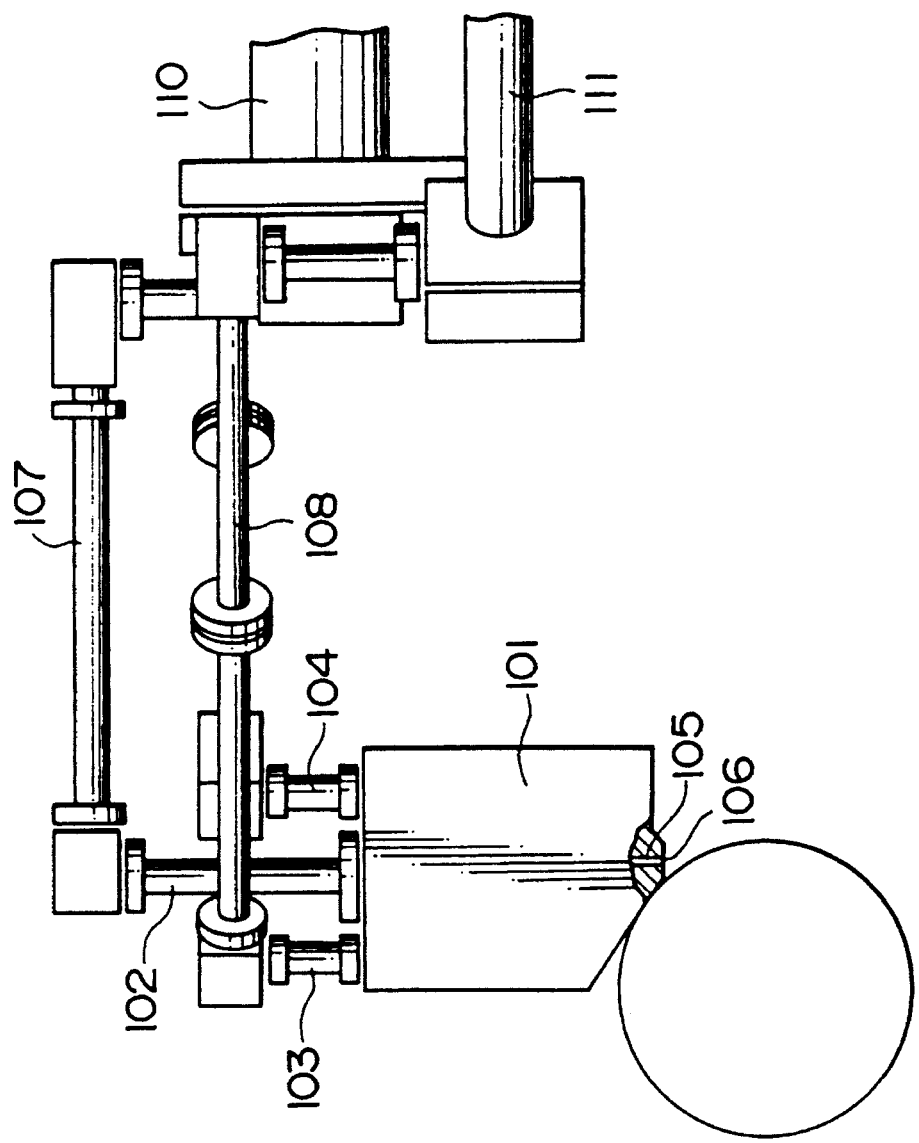
FIG. 23 is a side view of FIG. 22.
Figure 24:
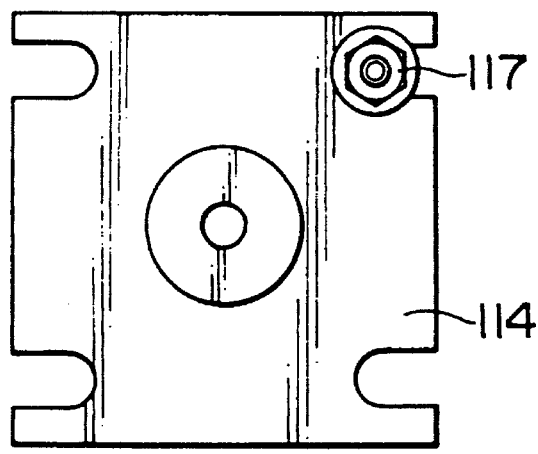
FIG. 24 is a front view of a conventional filter.
Figure 25:
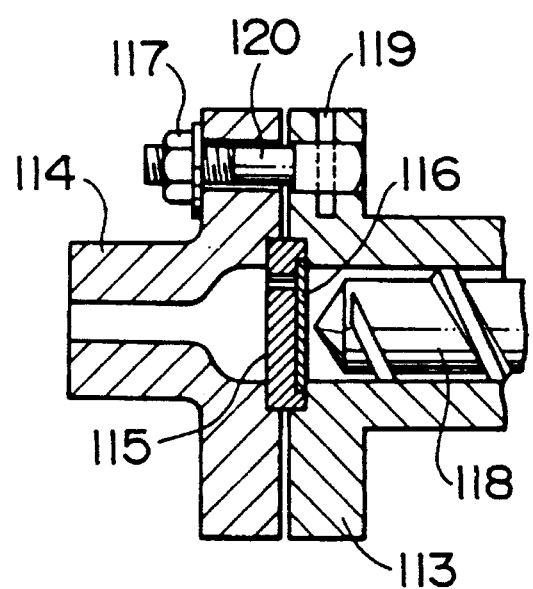
FIG. 25 is a sectional side elevation of FIG. 24.
Figure 26:
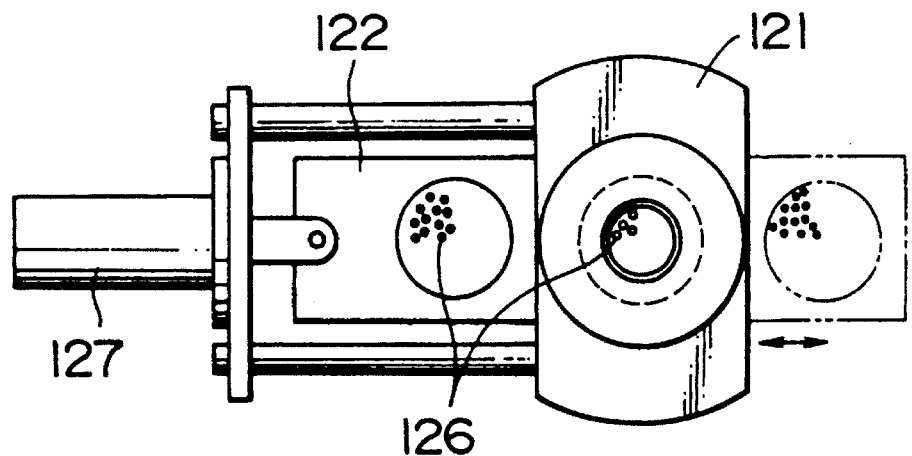
FIG. 26 is a front view showing a conventional screen changer equipped with filters.
Figure 27:
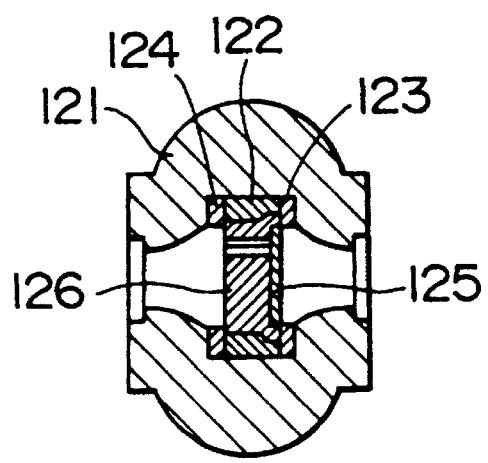
FIG. 27 is a sectional side elevation of FIG. 26.

Here, in order to remove foreign substances contained in the molten resin, a filtering device 63 for main extruder 60 shown in FIG. 14 has a plurality of star-shaped cylindrical filters 65 therein while a filtering device 64 for auxiliary extruder 61 or 62 as shown in FIG. 13 has one starshaped cylindrical filter 65 therein. For these filters 65, any one of the above-described star-shaped cylindrical filters shown in FIGS. 1 through 5 may be used. More specifically, in the case of filtering device 63 for main extruder 60, a plurality of the star-shaped cylindrical filters are fixed on a plate 88. On the other hand, in the case of filtering device 64 for auxiliary extruder 61 or 62, one such filter is provided. All these filters 65 are attached with screws in a replaceable manner.

Star-shaped cylindrical filter 65 constructed by any one of those shown in FIGS. 1 to 5 is used as a unit element. In the case where the filer element is used for filtering device 63 for main extruder 60, a plurality of the filters are planted replaceably inside an external cylinder 86 as shown in FIG. 14. On the other hand, in the case where the filter element is used for filtering device 64 for auxiliary extruder 61 or 62, one such filter is attached replaceably in an external cylinder 87 as shown in FIG. 13. It should be noted that filtering members 1 and 41 shown in FIGS. 1 and 4 can be composed by, other than a sintered metallic screen, laminated metallic screens, calcinated, laminated metallic screens, sintered metallic felt fabric or sintered metal powder, etc. In the above-mentioned figures, p denotes a flow of molten resin.

Star-shaped cylindrical filter 65, which has an extremely large flitrating area as compared to the outside dimension thereof, can be mounted inside the conduits which also serve to communicate the cylinders of auxiliary extruders 61 and 62 with the T-die so as to supply molten resins. Accordingly, no particular space for filtering device 64 is required.

As to filtering device 63, a number, in association with the amount of resin supply, of the star-shaped cylindrical filter elements each having such an extremely large flitrating area are bundled in parallel to form filtering device 63. The thus constructed filtering device 63 is disposed downstream of the cylinder of main extruder 60. On the other hand, the same star-shaped cylindrical filter element is used as the elements for resin layer-dedicated filtering devices 63 and 64 for forming different resin layers in a multi-layer resin structure. With this configuration, all the resins for different layers can be uniformed in quality and therefore the quality of the film produced can be improved. Further, it is also possible to linger the life or exchange span of the elements in filtering devices 63 and 64. Moreover, all the elements for filtering devices 63 and 64 forming different resin layers can be exchanged by common tools so that the levels of reliability for all the filter devices can be equalized.

What is claimed is:

1. A filter assembly for filtering a molten resin comprising:

a cylindrical filtering member formed with a large number of projections and arc-shaped recesses;

a supporter which is disposed inside the cylindrical filtering member, said supporter having a central shaft with arc shaped projections extending outwardly therefrom a recessed portions formed between the projections, wherein said cylindrical filtering member is supported at arc-shaped projected portions of said supporter and wherein said recessed portions of the supporter are formed closer toward a cylindrical center than the recesses of the filtering member thereby forming a space which provides a passage along which the molten resin, having passed through the recesses of the filtering member from outside to inside, flows in a length-wise direction to the filtering member; said supporter being impermeable to said molten resin;

an upper lid member disposed at one end of the supporter and attached to one end of the filtering member;

a lower lid member disposed at the other end of the supporter, attached to the other end of the filtering member and having an orifice for discharging molten resin.

2. The filter assembly for filtrating molten resin according to claim 1 wherein the supporter comprising;

a plurality of rod members, each of which having a circular section and being in contact with a corresponding projected portion of said filtering member;

a cylindrically centered member; and a plurality of connecting members disposed at intervals in the length-wise direction of said supporter for joining the rod members with the cylindrically centered member.

3. The filter assembly for filtrating molten resin according to claim 1 wherein said supporter is constructed of a cylinder having projected and recessed portions and has a star-shaped cross-section.

4. The filter assembly for filtrating molten resin according to claim 1 wherein each of said lid members being provided with a groove having the same shape with the cross-section of said filtering member so as to allow the filtering member to be inserted into the groove.

5. The filter assembly for filtrating molten resin according to claim 1 wherein the cross-section of said cylindrical filtering member is uniform.

6. The filter assembly for filtrating molten resin according to claim 1 wherein the cross-section of said cylindrical filtering member becomes greater from the upstream side toward the downstream side.

7. The filter assembly for filtrating molten resin according to claim 1 wherein said filtering member is selected from the group consisting of a laminated metallic screen, a calcinated laminated metallic screen, a sintered metal felt fabric, or a sintered metal powder.

8. The filter assembly for filtrating molten resin according to claim 1 wherein at least one of said lid members is attached to said supporter and is removable.

9. A filtering device for filtrating molten resin comprising a cylinder and the filter assembly according to claim 1 disposed inside the cylinder, wherein unfiltered molten resin flows through spaces formed between the cylinder and the filter.

10. A filtering device for filtrating molten resin comprising a cylinder and at least two of the filter assemblies according to claim 1, in parallel arrangement with one another, wherein unfiltered molten resin flows through spaces formed between the cylinder and the at least two filters.

* * * * *